United States Patent
Obayashi et al.

(10) Patent No.: US 12,555,369 B2
(45) Date of Patent: Feb. 17, 2026

(54) NEURAL NETWORK SYSTEM USING SEPARABLE CONVOLUTION

(71) Applicant: CANON KABUSHIKI KAISHA, Tokyo (JP)

(72) Inventors: Masaaki Obayashi, Kanagawa (JP); Akitoshi Yamada, Kanagawa (JP); Yoshinori Mizoguchi, Tokyo (JP); Hisashi Ishikawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 18/363,586

(22) Filed: Aug. 1, 2023

(65) Prior Publication Data

US 2024/0046631 A1    Feb. 8, 2024

(30) Foreign Application Priority Data

Aug. 4, 2022 (JP) ................. 2022-124719

(51) Int. Cl.
*G06V 10/82* (2022.01)
*G06N 3/0464* (2023.01)
*G06N 3/084* (2023.01)
*G06V 10/764* (2022.01)

(52) U.S. Cl.
CPC ........... *G06V 10/82* (2022.01); *G06N 3/0464* (2023.01); *G06N 3/084* (2013.01); *G06V 10/764* (2022.01)

(58) Field of Classification Search
CPC .... G06V 10/82; G06V 10/764; G06V 10/454; G06V 10/70; G06V 10/776; G06V 10/806; G06V 10/26; G06V 10/40; G06V 10/44; G06N 3/0464; G06N 3/084; G06N 3/048; G06N 3/045; G06N 3/08; G06N 3/09; G06N 3/04; G06N 3/082; G06N 3/063; G06N 3/0455; G06N 3/0495; G06N 3/044; G06T 2207/20081; G06T 2207/20084; G06T 2207/10024; G06T 7/11

See application file for complete search history.

(56) References Cited

U.S. PATENT DOCUMENTS

| | | | | |
|---|---|---|---|---|
| 10,628,710 | B2 * | 4/2020 | Ioffe | G06N 3/08 |
| 11,100,647 | B2 * | 8/2021 | Nikolov | A61B 6/501 |
| 11,507,798 | B2 * | 11/2022 | Shi | G06N 3/045 |
| 11,593,614 | B2 * | 2/2023 | Chollet | G06V 10/454 |
| 12,272,065 | B2 * | 4/2025 | Choi | G06T 7/11 |
| 12,327,176 | B1 * | 6/2025 | Linzer | G06N 3/063 |
| 2016/0358038 | A1 * | 12/2016 | Jaderberg | G06N 3/084 |

(Continued)

FOREIGN PATENT DOCUMENTS

JP        2019535084 A    12/2019

*Primary Examiner* — Michael S Osinski
(74) *Attorney, Agent, or Firm* — Canon U.S.A., Inc. IP Division

(57) ABSTRACT

A neural network system includes a separable convolution subnetwork. The separable convolution subnetwork includes a plurality of separable convolutional neural network (SCNN) layers arranged in a stack manner in sequence. Each of the plurality of SCNN layers applies a first grouped convolution to an input to the SCNN layer. An input to the first grouped convolution includes a plurality of channels, and the first grouped convolution is a spatial convolution which divides channels of an input to the first grouped convolution into groups in a channel-wise manner, convolves the grouped channels, and couples the convolved channels to generate an output.

31 Claims, 7 Drawing Sheets

(56) References Cited

U.S. PATENT DOCUMENTS

| | | | | |
|---|---|---|---|---|
| 2017/0032222 | A1* | 2/2017 | Sharma | G06V 10/449 |
| 2017/0330068 | A1* | 11/2017 | Yu | G06F 18/253 |
| 2018/0315154 | A1* | 11/2018 | Park | G06V 10/50 |
| 2018/0315155 | A1* | 11/2018 | Park | G06N 3/063 |
| 2018/0330194 | A1* | 11/2018 | Peng | G06V 10/764 |
| 2019/0042892 | A1* | 2/2019 | Wolf | G06N 3/0464 |
| 2020/0057924 | A1* | 2/2020 | Ioffe | G06V 10/82 |
| 2020/0058126 | A1* | 2/2020 | Wang | G16H 30/20 |
| 2020/0089772 | A1* | 3/2020 | Gomez | G06N 3/08 |
| 2020/0265314 | A1* | 8/2020 | Shi | G06N 3/045 |
| 2020/0401871 | A1* | 12/2020 | Tseng | G06T 7/246 |
| 2021/0027140 | A1* | 1/2021 | Chollet | G06V 10/454 |
| 2021/0081775 | A1* | 3/2021 | Leobandung | G11C 11/54 |
| 2021/0256363 | A1* | 8/2021 | Nair | G06N 3/063 |
| 2021/0294875 | A1* | 9/2021 | Komuravelli | G06F 17/16 |
| 2021/0334072 | A1* | 10/2021 | Komuravelli | G06F 17/16 |
| 2022/0164934 | A1* | 5/2022 | Gao | G06V 10/7747 |
| 2022/0303557 | A1* | 9/2022 | Gonsalves | H04N 19/85 |
| 2022/0367052 | A1* | 11/2022 | Liu | G16H 50/20 |
| 2023/0316699 | A1* | 10/2023 | Qi | G06V 20/70 |
| | | | | 382/157 |
| 2023/0334872 | A1* | 10/2023 | Guo | G06V 10/774 |

* cited by examiner

NEURAL NETWORK SYSTEM USING SEPARABLE CONVOLUTION

BACKGROUND

Technical Field

Aspects of the present disclosure generally relate to a neural network system, a processing method for a neural network system, and a storage medium.

Description of the Related Art

Neural networks are machine learning models which employ one or a plurality of layers of nonlinear units to predict an output for a received input. Some neural networks include one or a plurality of hidden layers in addition to an output layer. The output of each hidden layer is used as an input to another layer in the network, for example, the next hidden layer or the output layer. Each layer of the network generates an output from a received input according to current values of a respective set of parameters.

Convolutional neural networks generally include convolutional neural network layers and, in some cases, fully-connected neural network layers and other types of neural network layers. Convolutional neural network layers have sparse connectivity, so that each node in a convolutional layer receives an input from only a subset of the nodes in the next lowest neural network layer. Some convolutional neural network layers have nodes which share weights with other nodes in the layer. However, nodes in fully-connected layers receive inputs from each node in the next lowest neural network layer.

Japanese Unexamined Patent Application Publication (Translation of PCT Application) No. 2019-535084 discusses a neural network system implemented by one or a plurality of computers and configured to receive an input image and to generate a network output for the input image. The neural network system includes a separable convolution subnetwork, which includes a plurality of separable convolutional neural network (SCNN) layers arranged in a stack manner in sequence. Each SCNN layer is configured to separately apply both a depthwise convolution and a pointwise convolution during processing of an input to the SCNN layer to generate a layer output.

With regard to the neural network system discussed in Japanese Unexamined Patent Application Publication No. 2019-535084, since the amount of calculation for convolution is extremely large, there is an issue in which the memory usage and the processing time may become extremely large.

SUMMARY

Aspects of the disclosure are generally directed to enabling reducing the amount of calculation for convolution.

According to an aspect of the disclosure, a neural network system includes a separable convolution subnetwork. The separable convolution subnetwork includes a plurality of separable convolutional neural network (SCNN) layers arranged in a stack manner in sequence. Each of the plurality of SCNN layers applies a first grouped convolution to an input to the SCNN layer. An input to the first grouped convolution includes a plurality of channels, and the first grouped convolution is a spatial convolution which divides channels of an input to the first grouped convolution into groups in a channel-wise manner, convolves the grouped channels, and couples the convolved channels to generate an output.

Further features of the disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings. In various figures, similar reference numbers and designations denote the respective similar elements.

Figure 1:
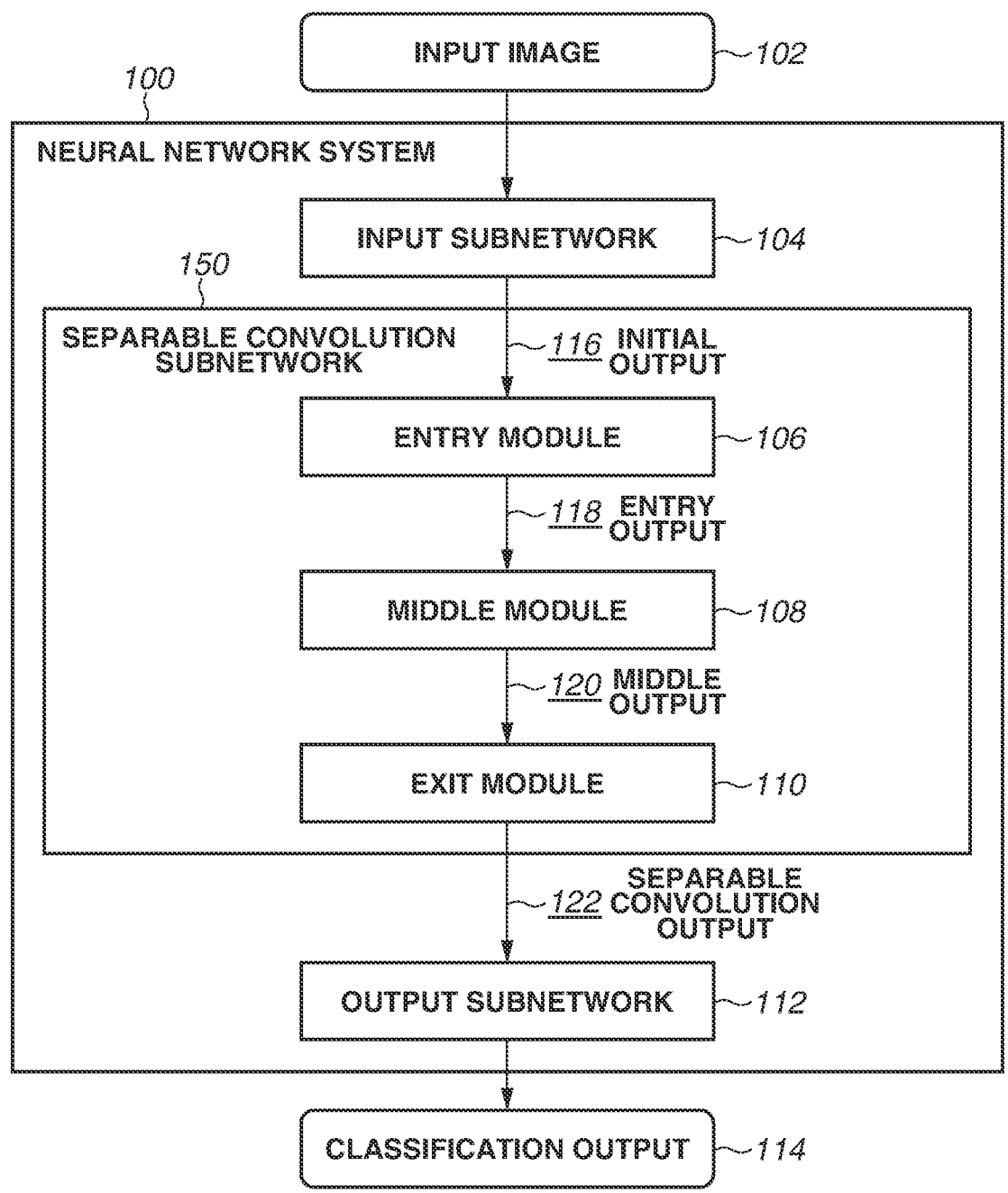
FIG. 1 is a block diagram illustrating a configuration example of a neural network system.

FIG. 1 is a block diagram illustrating an example of a configuration of a neural network system 100 in a first exemplary embodiment. The neural network system 100 is an example of a system implemented as computer programs on one or a plurality of computers in one or a plurality of locations, in which the systems, components, and techniques described below can be implemented.

The neural network system 100 includes an input subnetwork 104, a separable convolution subnetwork 150, and an output subnetwork 112, and receives an input image 102 and outputs a classification output 114 for the input image 102. The separable convolution subnetwork 150 includes an entry modules 106, a middle module 108, and an exit module 110. The neural network system 100 processes the input image 102 with use of a deep neural network, for example, a convolutional neural network. In software, a module may be a standalone piece of code that provides specific and tightly coupled functionality. In hardware, a module may be a standalone circuit that provides specific outputs. Modules may be connected together by functional interfaces such as parameter passing (in software) or wirings or connectors (in hardware).

The neural network system 100 includes the input subnetwork 104. The input subnetwork 104 includes one or a plurality of convolutional neural network layers. The input subnetwork 104 receives the input image 102 and processes the input image 102 to generate an initial output 116.

The separable convolution subnetwork 150 includes one or a plurality of entry modules 106. The one or a plurality of entry modules 106 receives the initial output 116 and processes the initial output 116 to generate an entry output 118.

The separable convolution subnetwork 150 includes one or a plurality of middle modules 108. The one or a plurality of middle modules 108 receives the entry output 118 and processes the entry output 118 to generate a middle output 120.

The exit module 110 receives the middle output 120 and processes the middle output 120 to generate a separable convolution output 122 of the separable convolution subnetwork 150.

The neural network system 100 includes the output subnetwork 112. The output subnetwork 112 receive the separable convolution output 122. The output subnetwork 112 processes the separable convolution output 122 to generate a classification output 114 for the input image 102.

The architecture of the output subnetwork 112 is specific to a task which the neural network system 100 performs. For example, when the neural network system 100 is performing an image classification task, the output subnetwork 112 includes a softmax layer and, optionally, one or a plurality of fully-connected layers preceding the softmax layer. A softmax is a mathematical function that converts a vector of numbers into a vector of probabilities. These layers process the separable convolution output 122 to generate a classification output 114 for the input image 102.

As mentioned above, the neural network system 100 receives an input image 102. Then, the neural network system 100 processes the input image 102 with use of a separable convolution subnetwork 150 to generate a classification output 114 for the input image 102.

The neural network system 100 can be configured to generate any type of score, regression, or classification output based on the input image 102, i.e., can be configured to perform any type of image processing task. The score or classification output generated by the neural network system 100 depends on a task which the neural network system 100 has been configured to confirm.

The neural network system 100 generates one or a plurality of scores or classification outputs at the output layer of the separable convolution subnetwork 150 or at any appropriate hidden layer of one or a plurality of hidden layers of the separable convolution subnetwork 150. For example, for an image classification or recognition task, the output generated by the neural network system 100 for a given image can be scores for each of a set of object categories. Each score represents a likelihood in which the image contains an image of an object belonging to the category.

As another example, for an object detection task, the output generated by the neural network system 100 can identify a location, a size, or both, of an object of interest in the input image. As yet another example, the output generated by the neural network system 100 can be the output of one of the hidden layers of the network and can be provided for use as a numeric representation, i.e., a numeric embedding, of the input image.

The separable convolution subnetwork 150 includes a plurality of separable convolutional neural network (SCNN) layers arranged in a stack manner in sequence. The SCNN layer includes a grouped convolution, i.e., a spatial convolution which divides channels of an input into groups in a channel-wise manner, convolves the grouped channels, and couples the convolved channels to generate an output. After that, in the SCNN layer, a pointwise convolution, i.e., a regular convolution with 1×1 windows, follows, and the channels calculated by the regular convolution are projected onto a new channel space.

The grouped convolution performs grouping by dividing CM input channels into G subgroups, uses, with respect to only Cin/G channel portions, G kernels Kg (Cin/G) each handling a convolution for only that group, and performs the same processing as that in a regular convolution in parallel and independently over G groups. While the regular convolution needs to perform spatial filtering, the grouped convolution is broken down into calculations for the "combinations of CM input channels and kernels Kg×G groups" and is, therefore, able to reduce the amount of calculation to 1/G times. Moreover, the depthwise convolution can be considered to be performed when the number CM of input channels and the number G of groups are equal to each other. Therefore, in the following, a grouped convolution excluding a convolution which is performed when the number Cin of input channels and the number G of groups are equal to each other is described.

Each SCNN layer is configured to separately apply both a grouped convolution and a pointwise convolution during processing of an input to the SCNN layer. For example, the SCNN layer first divides a received input into groups in a channel-wise manner, convolves the groups, and couples the convolved groups to generate an output, i.e., performs a grouped convolution to generate an intermediate output. Then, the SCNN layer perform a 1×1 convolution, i.e., a pointwise convolution, on the intermediate output to generate a layer output.

As another example, the SCNN layer can first perform a 1×1 convolution on the received input to generate an intermediate output and then perform a grouped convolution on the intermediate output to generate a layer output.

As another example, the SCNN layer performs a 1×1 convolution on the received input, i.e., performs a grouped pointwise convolution which divides an input into groups in a channel-wise manner, convolves the groups, and couples the convolved groups to generate an output, to generate an intermediate output. Then, the SCNN layer performs a regular convolution on the intermediate output to generate a layer output. At this time, the grouped pointwise convolution is broken into "combinations of Cin input channels and kernels Kg×G groups" and is, therefore, able to reduce the amount of calculation to 1/G times. Here, when G is larger than "1", the amount of calculation can be reduced as a whole.

Moreover, since the input is divided into groups, even if the number of channels which the respective groups refer to is decreased, kernels of the respective different groups are learned while the dependence relationship between input channels and output channels is maintained. This enables expecting not only a reduction in calculation cost caused by parallelization but also an increase in expressive power caused by widened expression, so that a learning effect is not reduced.

Specifically, the separable convolution subnetwork 150 includes a sequence of modules including one or a plurality of entry modules 106 followed by one or a plurality of middle modules 108 followed by an exit module 110. For example, the separable convolution subnetwork 150 includes three entry modules 106. The separable convolution subnetwork 150 includes eight middle modules 108.

Each module includes a plurality of SCNN layers arranged in a stack manner in sequence. Each module is configured to process a module input to generate a module output for the module input. Each module then provides the module output as an input to the next module. If there are no modules following the current module, i.e., if the module of interest is the last module in the sequence, the module of interest provides the module output as a separable convolution output 122 of the separable convolution subnetwork 150. Exemplary configurations of the entry module 106, the middle module 108, and the exit module 110 are described below in detail with reference to FIG. 2 to FIG. 4.

Figure 2:
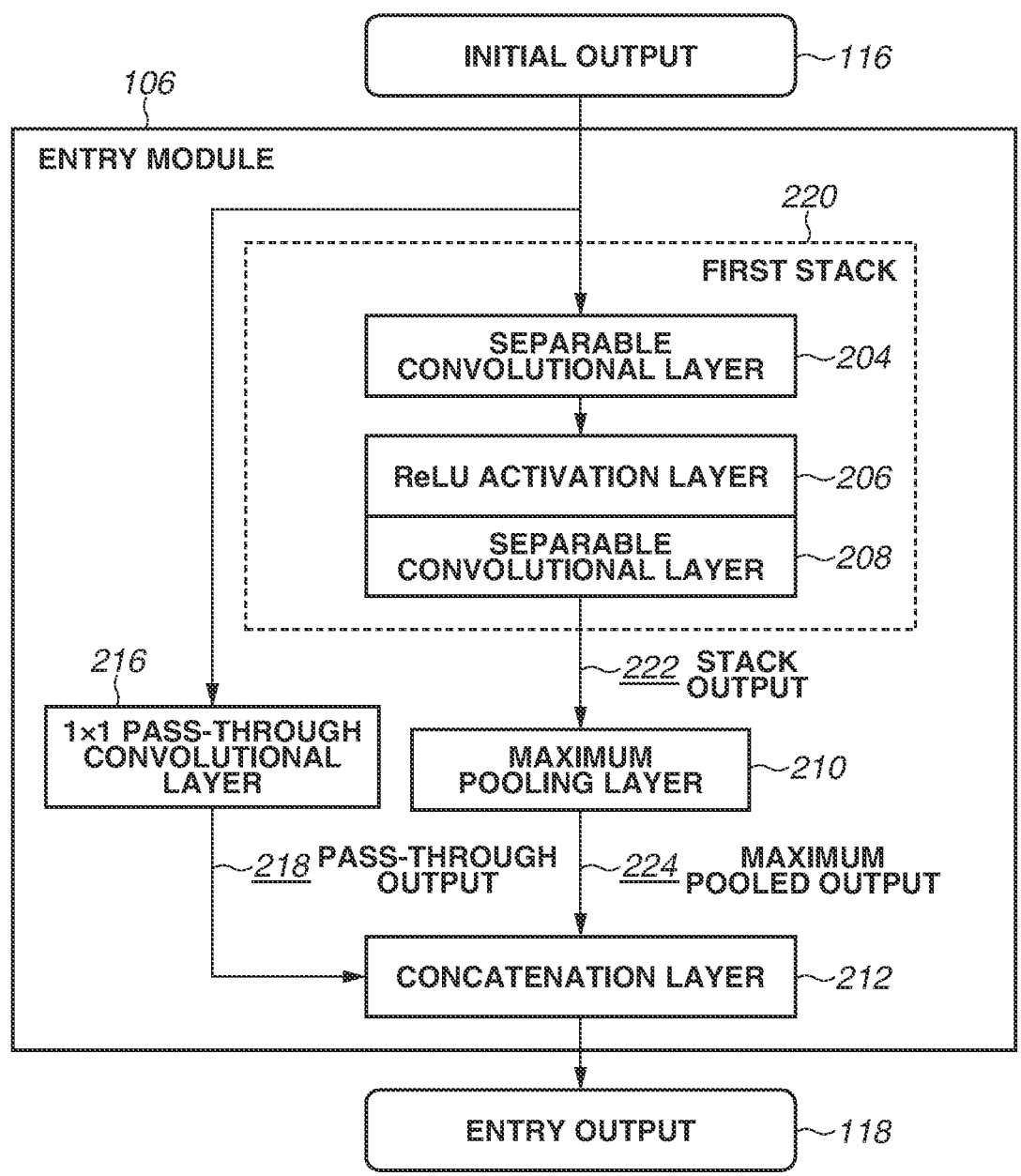
FIG. 2 is a block diagram illustrating a configuration example of an entry module.

FIG. 2 is a block diagram illustrating an example of a configuration of the entry modules 106 illustrated in FIG. 1. The entry module 106 includes a first stack 220, a maximum pooling layer 210, a concatenation layer 212, and a first pass-through convolutional layer 216, and receives an initial output 116 and outputs an entry output 118.

The entry module 106 receives an initial output 116. In some cases, the initial output 116 is an initial output generated by the input subnetwork 104 from an input image 102. In some other cases, the initial output 116 is a module output generated by a preceding entry module. In some other cases, the initial output 116 is an input image.

The entry module 106 includes the first pass-through convolutional layer 216. The first pass-through convolutional layer 216 processes the initial output 116 to generate a first pass-through output 218. The first pass-through convolutional layer 216 is a 1×1 convolutional layer.

The entry module 106 includes the first stack 220. The first stack 220 includes a separable convolutional layer 204, a rectified linear unit (ReLU) activation layer 206, and a separable convolutional layer 208, and receives the initial output 116 and outputs a first stack output 222. Each of the separable convolutional layers 204 and 208 is an SCNN layer. The first stack 220 processes the initial output 116 to generate a first stack output 222.

Each of the separable convolutional layers 204 and 208 separately applies both a grouped convolution and a pointwise convolution during processing of an input to the separable convolutional layer to generate a layer output. Furthermore, the ReLU activation layer 206 can be omitted. The separable convolutional layer 204 provides an output of the separable convolutional layer 204 as an input to the next separable convolutional layer 208. Moreover, if there are no layers following the current layer, the separable convolutional layer 208 provides an output of the separable convolutional layer 208 as a first stack output 222.

In an example, one or both of the separable convolutional layers 204 and 208 included in the first stack 220 are preceded by the ReLU activation layer 206. For example, the separable convolutional layer 208 is preceded by the ReLU activation layer 206. The ReLU activation layer 206 applies a ReLU activation function to an output of the preceding separable convolutional layer 204 to generate a ReLU output. The ReLU output is provided as an input to the next separable convolutional layer 208 following the ReLU activation layer 206.

In another example, one or both of the separable convolutional layers 204 and 208 included in the first stack 220 are followed by a batch normalization layer, which performs batch normalization. The batch normalization layer enables higher learning rates and robust initialization by making normalization of a part of a model architecture and performing the normalization for each training minimum-batch of training data. Bath normalization is described in detail in S. Ioffe and C. Szegedy, "Batch normalization: Accelerating deep network training by reducing internal covariate shift" In Proceedings of The 32nd International Conference on Machine Learning, pages 448-456, 2015.

The entry module 106 includes a maximum pooling layer 210. The maximum pooling layer 210 performs maximum pooling on the first stack output 222 to generate a maximum pooled output 224.

The entry module 106 further includes a concatenation layer 212. The concatenation layer 212 concatenates the first pass-through output 218 and the maximum pooled output 224 to generate an entry output 118 of the entry module 106. For example, the concatenation layer 212 concatenates tensors generated by the first pass-through convolutional layer 216 and the maximum pooling layer 210 along the depth dimension to generate a single tensor of the entry module 106, i.e., the entry output 118.

The entry output 118 is then provided as an input to another entry module 106 or a middle module 108.

Figure 3:
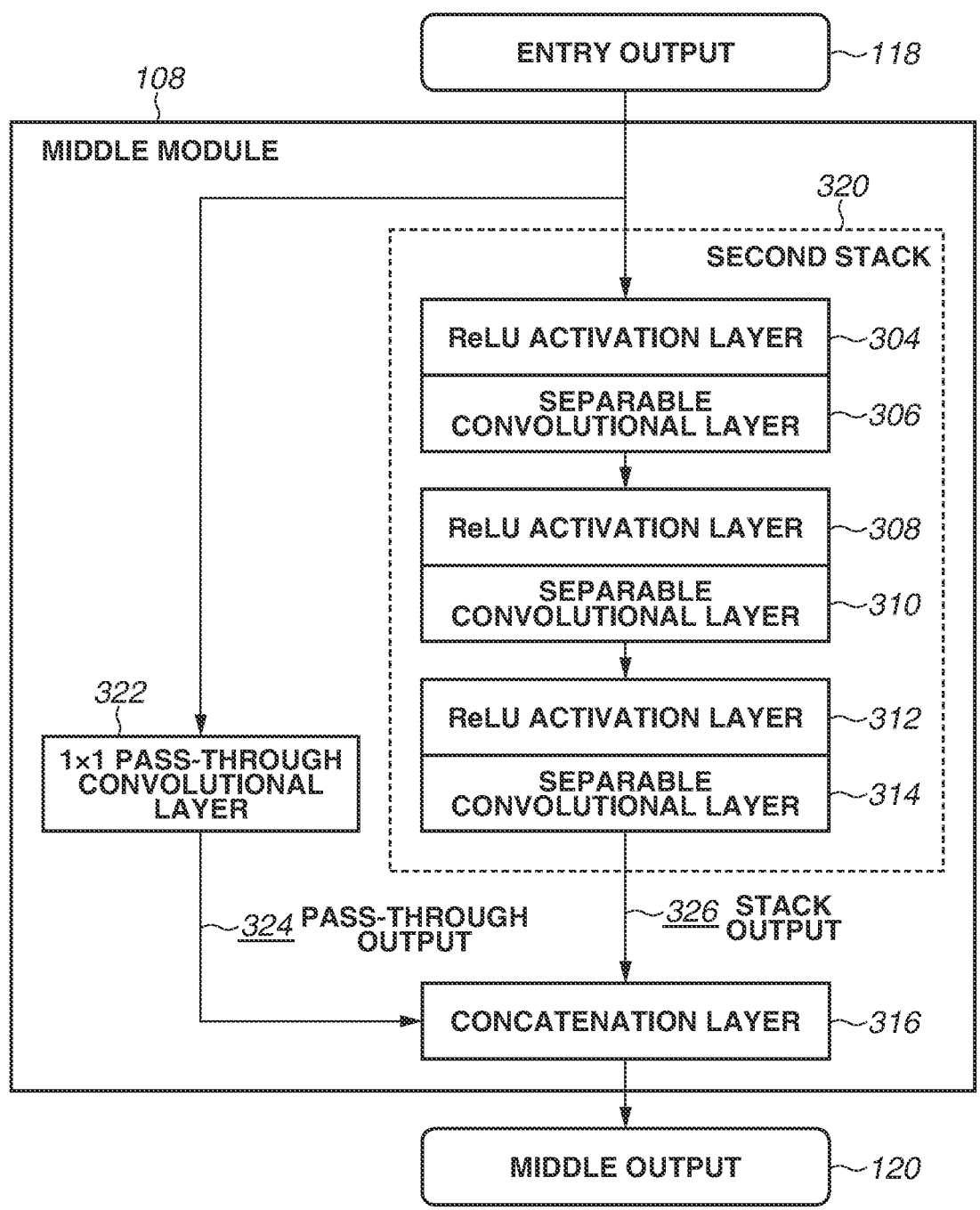
FIG. 3 is a block diagram illustrating a configuration example of a middle module.

FIG. 3 is a block diagram illustrating an example of a configuration of the middle module 108 illustrated in FIG. 1. The middle module 108 has more SCNN layers than the entry module 106 and does not include a maximum pooling layer, unlike the entry module 106.

The middle module 108 includes a second stack 320, a second pass-through convolutional layer 322, and a concatenation layer 316, and receives an entry output 118 and outputs a middle output 120. The middle module 108 receives the entry output 118. For example, the entry output 118 is an entry output generated by the entry module 106. In another example, the entry output 118 is a module output generated by the preceding middle module 108.

The middle module 108 includes the second pass-through convolutional layer 322. The second pass-through convolutional layer 322 processes the entry output 118 to generate a second pass-through output 324. The second pass-through convolutional layer 322 is a 1×1 convolutional layer.

The middle module 108 includes the second stack 320. The second stack 320 includes ReLU activation layers 304, 308, and 312 and separable convolutional layers 306, 310, and 314, receives an entry output 118 and outputs a second stack output 326. Each of the separable convolutional layers 306, 310, and 314 is an SCNN layer. The second stack 320 processes the entry output 118 to generate a second stack output 326.

Specifically, each of the separable convolutional layers 306, 310, and 314 separately applies both a grouped convolution and a pointwise convolution in sequence during processing of an input to the separable convolutional layer to generate a layer output. Furthermore, the ReLU activation layers 304, 308, and 312 can be omitted. The separable convolutional layers 306 and 310 provide outputs of the separable convolutional layers 306 and 310 as inputs to the next separable convolutional layers 310 and 314, respectively. If there are no layers following the current layer, the separable convolutional layer 314 provides an output of the separable convolutional layer 314 as a second stack output 326.

For example, the separable convolutional layers 306, 310, and 314 are preceded by the ReLU activation layers 304, 308, and 312, respectively. For example, the separable convolutional layer 306 is preceded by the ReLU activation layer 304. The separable convolutional layer 310 is preceded by the ReLU activation layer 308. The separable convolutional layer 314 is preceded by the ReLU activation layer 312.

The ReLU activation layer 304 applies a ReLU activation function to the entry output 118 to generate an intermediate output. The intermediate output is provided as an input to the next separable convolutional layer 306. The ReLU activation layer 308 applies a ReLU activation function to the output of the preceding separable convolutional layer 306 to generate an intermediate output. The intermediate output is provided as an input to the next separable convolutional layer 310. The ReLU activation layer 312 applies a ReLU activation function to the output of the preceding separable convolutional layer 310 to generate an intermediate output.

The intermediate output is provided as an input to the next separable convolutional layer 314.

Furthermore, one or a plurality of the separable convolutional layers 306, 310, and 314 can be configured to be followed by a batch normalization layer.

The middle module 108 includes the concatenation layer 316. The concatenation layer 316 concatenates the second pass-through output 324 and the second stack output 326 to generate a middle output 120 of the middle module 108. The middle output 120 is provided as an input to another middle module 108 or the exit module 110.

Figure 4:
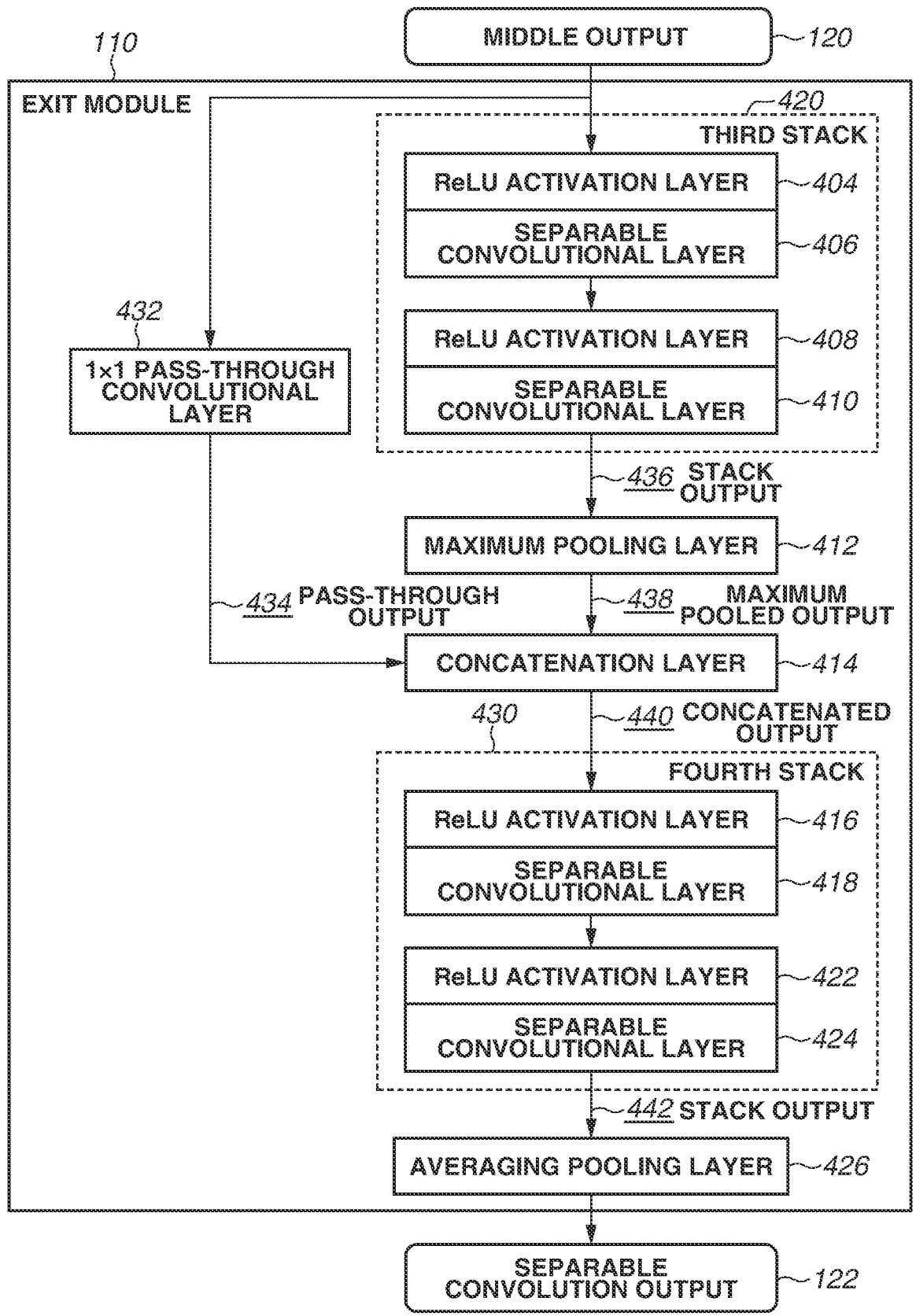
FIG. 4 is a block diagram illustrating a configuration example of an exit module.

FIG. 4 is a block diagram illustrating an example of the exit module 110 illustrated in FIG. 1. The exit module 110 includes a third stack 420, a maximum pooling layer 412, a third pass-through convolutional layer 432, a concatenation layer 414, a fourth stack 430, and an averaging pooling layer 426. The exit module 110 receives a middle output 120 and outputs a separable convolution output 122.

The exit module 110 receives the middle output 120. The middle output 120 is a middle output generated by the middle module 108. The exit module 110 includes the third pass-through convolutional layer 432. The third pass-through convolutional layer 432 processes the middle output 120 to generate a third pass-through output 434. The third pass-through convolutional layer 432 is a 1×1 convolutional layer.

The exit module 110 includes the third stack 420. The third stack 420 includes ReLU activation layers 404 and 408 and separable convolutional layers 406 and 410. Each of the separable convolutional layers 406 and 410 is an SCNN layer. The third stack 420 processes the middle output 120 to generate a third stack output 436.

Specifically, each of the separable convolutional layers 406 and 410 separately applies both a grouped convolution and a pointwise convolution in sequence during processing of an input to the separable convolutional layer to generate a layer output. The ReLU activation layers 404 and 408 can be omitted. The separable convolutional layer 406 provides an output of the separable convolutional layer 406 as an input to the next separable convolutional layer 410. If there are no layers following the current layer, the separable convolutional layer 410 provides an output of the separable convolutional layer 410 as a third stack output 436.

For example, the separable convolutional layer 406 is preceded by the ReLU activation layer 404. The separable convolutional layer 410 is preceded by the ReLU activation layer 408. The ReLU activation layer 404 applies a ReLU activation function to the middle output 120 to generate an intermediate output.

The intermediate output is provided as an input to the subsequent separable convolutional layer 406. The ReLU activation layer 408 applies a ReLU activation function to an output of the preceding separable convolutional layer 406 to generate an intermediate output. The intermediate output is provided as an input to the next separable convolutional layer 410.

Furthermore, one or both of the separable convolutional layers 406 and 410 can be configured to be followed by a batch normalization layer.

The exit module 110 includes the maximum pooling layer 412. The maximum pooling layer 412 performs maximum pooling on the third stack output 436 to generate a maximum pooled output 438.

The exit module 110 includes the concatenation layer 414. The concatenation layer 414 concatenate the third pass-through output 434 and the maximum pooled output 438 to generate a concatenated output 440. For example, the concatenation layer 414 concatenates tensors generated by the third pass-through convolutional layer 432 and the maximum pooling layer 412 along the depth dimension to generate a single tensor, i.e., the concatenated output 440.

The exit module 110 includes the fourth stack 430. The fourth stack 430 includes ReLU activation layers 416 and 422 and separable convolutional layers 418 and 424. The fourth stack 430 processes the concatenated output 440 to generate a fourth stack output 442.

Specifically, each of the separable convolutional layers 418 and 424 separately applies both a grouped convolution and a pointwise convolution in sequence during processing of an input to the separable convolutional layer to generate a layer output. The ReLU activation layers 416 and 422 can be omitted. The separable convolutional layer 418 provides an output of the separable convolutional layer 418 as an input to the next separable convolutional layer 424. The separable convolutional layer 424 provides an output of the separable convolutional layer 424 as a fourth stack output 442.

For example, the separable convolutional layer 418 is preceded by the ReLU activation layer 416. The separable convolutional layer 424 is preceded by the ReLU activation layer 422. The ReLU activation layer 416 applies a ReLU activation function to the concatenated output 440 to generate an intermediate output. The intermediate output is provided as an input to the subsequent separable convolutional layer 418. The ReLU activation layer 422 applies a ReLU activation function to an output of the preceding separable convolutional layer 418 to generate an intermediate output. The intermediate output is provided as an input to the next separable convolutional layer 424.

Furthermore, one or both of the separable convolutional layers 418 and 424 can be configured to be followed by a batch normalization layer.

The exit module 110 includes the averaging pooling layer 426. The averaging pooling layer 426 performs average pooling on the fourth stack output 442 to generate a separable convolution output 122. The separable convolution output 122 is an output of the separable convolution subnetwork 150 illustrated in FIG. 1.

Figure 5:
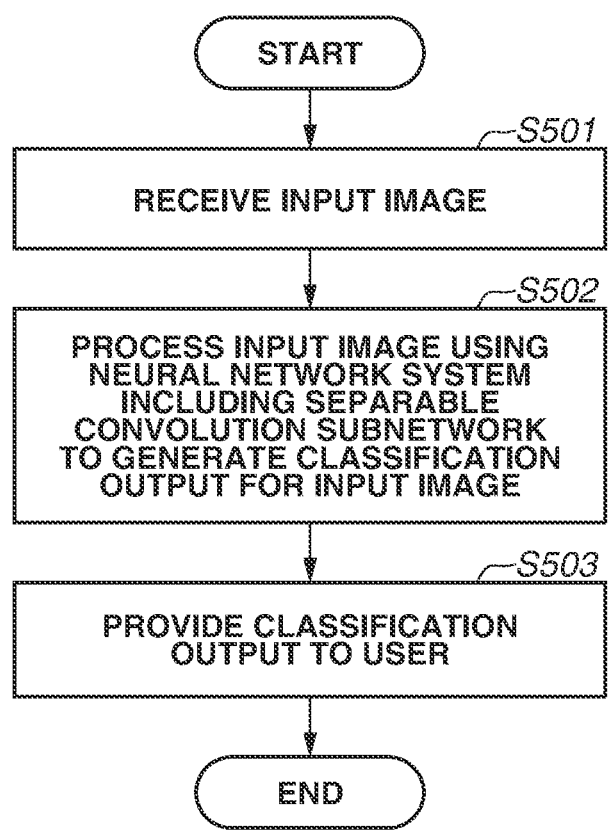
FIG. 5 is a flowchart illustrating a processing method for the neural network system.

FIG. 5 is a flowchart illustrating a processing method for the neural network system 100 illustrated in FIG. 1. The processing illustrated in the flowchart of FIG. 5 is performed by a system of one or a plurality of computers located in one or a plurality of locations. The neural network system 100 illustrated in FIG. 1 performs the processing illustrated in the flowchart of FIG. 5.

In step S501, the neural network system 100 receives an input image 102.

In step S502, the neural network system 100 processes the input image 102 with use of the neural network system 100 including the separable convolution subnetwork 150 to generate a classification output 114 for the input image 102. For example, the input subnetwork 104 processes the input image 102 to generate an initial output 116. The separable convolution subnetwork 150 processes the initial output 116 to generate a separable convolution output 122. The output subnetwork 112 processes the separable convolution output 122 to generate a classification output 114.

The separable convolution subnetwork 150 includes a sequence of modules including one or a plurality of entry modules 106 followed by one or a plurality of middle modules 108 followed by an exit module 110. Each module in the sequence includes a plurality of SCNN layers arranged in a stack manner in sequence. The separable convolution subnetwork 150 processes the input image 102 or the initial output 116 via each of the modules included in the sequence to generate a separable convolution output 122.

For example, the neural network system 100 processes the separable convolution output 122 with use of the output subnetwork 112 to generate a classification output 114 for the input image 102. In another example, the output subnetwork 112 includes a softmax layer and, optionally, can be configured to include one or a plurality of fully-connected layers preceding the softmax layer. These layers process the separable convolution output 122 to generate the classification output 114 for the input image 102. In another example, the output subnetwork 112 includes a logistic regression layer and, optionally, can be configured to include one or a plurality of fully-connected neural network layers preceding the logistic regression layer. These layers process the separable convolution output 122 to generate the classification output 114 for the input image 102.

The output of the neural network system 100 can be configured to be any type of score, regression, or classification output based on an image processing task which is configured to be performed by the neural network system 100. For example, in some cases, the neural network system 100 may be configured to perform an image classification or recognition task. In those cases, the output of the neural network system 100 can include a respective score for each of a predetermined set of object categories. The score for a given object category represents a likelihood in which the input image contains an image of an object which belongs to the object category.

As another example, for an object detection task, the output of the neural network system 100 can identify a location, a size, or both, of an object of interest in the input image. As yet another example, the output of the neural network system 100 can be the output of one of the hidden layers of the network and can be provided for use as a numeric representation, i.e., a numeric embedding, of the input image.

In step S503, the neural network system 100 provides the classification output 114 to a user. For example, the output of the neural network system 100 can be configured to be data identifying one or a plurality of highest-scoring object categories. The neural network system 100 can provide the network output or the derived output for display on a user interface of a user device. Moreover, the neural network system 100 can be configured to store the network output or data derived from the network output in association with the input image 102.

The neural network system 100 can train the separable convolution subnetwork 150 on labeled training data with use of supervised learning techniques, for example, stochastic gradient descent (SGD) with backpropagation. Moreover, the neural network system 100 can also train the input subnetwork 104 and the output subnetwork 112 in the same way. Thus, the neural network system 100 can train, for example, the separable convolution subnetwork 150 to determine trained values of the parameter of the separable convolution subnetwork 150 from initial values of the separable convolution subnetwork 150 using a supervised learning technique.

Figure 6:
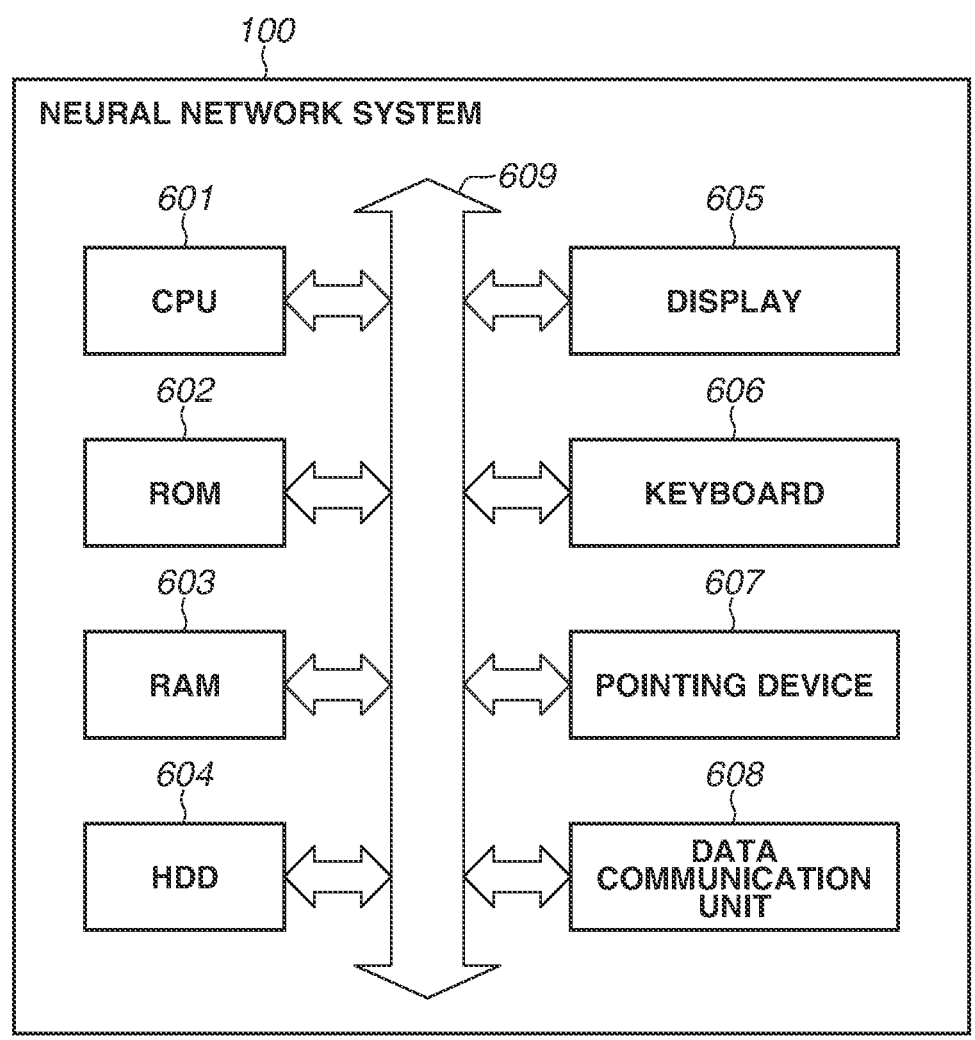
FIG. 6 is a block diagram illustrating an example of a hardware configuration.

FIG. 6 is a block diagram illustrating an example of a hardware configuration of the neural network system 100 illustrated in FIG. 1. The neural network system 100 is, for example, a personal computer or a smartphone. In the description of the first exemplary embodiment, the neural network system 100 is assumed to be a personal computer. The neural network system 100 includes a central processing unit (CPU) 601, a read-only memory (ROM) 602, a random access memory (RAM) 603, a hard disk drive (HDD) 604, a display 605, a keyboard 606, a pointing device 607, a data communication unit or circuit 608, and a data bus 609.

The CPU (processor) 601 comprehensively controls the neural network system 100, and implements the functions illustrated in FIG. 1 by reading out a program stored in, for example, the ROM 602 onto the RAM 603 and executing the program. Referring to FIG. 6, the CPU 601 is only one CPU, but can be configured to include a plurality of CPUs. The ROM 602 is a general-purpose ROM, in which, for example, a program to be executed by the CPU 601 is stored. The RAM 603 is a general-purpose RAM, which is used as, for example, a working memory for temporarily storing various pieces of information when the program is executed by the CPU 601. The HDD 604 is a storage medium (storage unit or circuit) for storing an image file and a processing result such as image classification.

The display 605 is a display unit or device which displays, to the user, a user interface (UI) employed in the first exemplary embodiment and a score for identifying an object category of image data (hereinafter also referred to as an "image"). The keyboard 606 and the pointing device 607 are configured to receive an operation for instruction from the user. The display 605 can include a touch sensor function. The keyboard 606 is used, for example, for the user to input images which the user wants to classify on the UI displayed on the display 605. The pointing device 607 is used, for example, for the user to click a button on the UI displayed on the display 605.

The data communication unit or circuit 608 is configured to perform communication with an external apparatus via a wired or wireless network. For example, the data communication unit 608 transmits a score for identifying an object category of an image to a server which is able to communicate with the neural network system 100. The data bus 609 interconnects the respective blocks illustrated in FIG. 6 in such a way as to enable communications between them.

Furthermore, the configuration illustrated in FIG. 6 is merely an example, and the first exemplary embodiment is not limited to this. For example, the neural network system 100 can be configured not to include the display 605 but to display the UI on an external display.

The present disclosure can also be implemented by processing for supplying a program for implementing one or more functions of the above-described first exemplary embodiment to a system or apparatus via a network or a storage medium and causing one or more processors included in a computer of the system or apparatus to read out and execute the program. Moreover, the present disclosure can also be implemented by a circuit which implements the above-mentioned one or more functions (for example, an application specific integrated circuit (ASIC)).

The neural network system 100 can be embodied by one or a plurality of storage media encoded with instructions. The instructions, when implemented by one or a plurality of computers, cause the one or a plurality of computers to implement the neural network system 100.

The first exemplary embodiment is able to realize one or a plurality of the following advantages. The neural network system 100 for image processing is able to achieve results which match or outperform the state of the art in performing a variety of image processing tasks, for example, image classification or object recognition. Additionally, the neural network system 100 for image processing is able to achieve results which are comparable to or better than conventional neural networks which have many more parameters and, therefore, require many more computing resources, i.e., memory and processing time, for storing the parameter values and for processing input images than the image processing neural network system 100. Therefore, the neural network system 100 is able to achieve results more excellent than those in conventional neural networks. Thus, the neural network system 100 is able to achieve these results while having a smaller computational footprint, i.e., using less memory and requiring less processing time, than conventional neural networks.

As described above, the neural network system 100 includes the separable convolution subnetwork 150, receives an input image 102 and generates a network output for the input image 102.

The separable convolution subnetwork 150 includes a plurality of SCNN layers arranged in a stack manner in sequence, such as the first stack 220, the second stack 320, the third stack 420, or the fourth stack 430. Each of the SCNN layers applies a first grouped convolution to at least an input to the SCNN layer. An input to the first grouped convolution includes a plurality of channels. The first grouped convolution is a spatial convolution which divides channels of the input to the first grouped convolution into groups in a channel-wise manner, convolves the grouped channels, and couples the convolved channels to generate an output.

Specifically, each of a plurality of SCNN layers separately applies a first grouped convolution and a pointwise convolution in sequence to an input to the SCNN layer to generate a layer output. The pointwise convolution is a 1×1 convolution which projects channels calculated by the first grouped convolution onto a new channel space.

Furthermore, each of a plurality of SCNN layers can be configured to separately apply a first grouped convolution and a regular convolution in sequence to an input to the SCNN layer to generate a layer output. The regular convolution is a regular convolution for channels calculated by the first grouped convolution.

The neural network system 100 includes an input subnetwork 104 and an output subnetwork 112. The input subnetwork 104 processes a network input to generate an initial output 116. The input subnetwork 104 includes one or a plurality of convolutional neural network layers. The output subnetwork 112 processes an output of the separable convolution subnetwork 150 to generate a network output.

The separable convolution subnetwork 150 includes one or a plurality of entry modules 106. The entry module 106 processes the initial output 116 to generate an output of the entry module 106.

The entry module 106 includes a first pass-through convolutional layer 216, a first stack 220, a first maximum pooling layer 210, and a first concatenation layer 212. The first pass-through convolutional layer 216 processes an input to the entry module 106 to generate a first pass-through output 218. The first stack 220 is the first stack of the SCNN layers, and processes an input to the entry module 106 to generate a first stack output 222. The first maximum pooling layer 210 performs maximum pooling on the first stack output 222 to generate a first maximum pooled output 224.

The first concatenation layer 212 concatenates the first pass-through output 218 and the first maximum pooled output 224 to generate an output of the entry module 106. For example, the separable convolution subnetwork 150 includes three entry modules 106. The first pass-through convolutional layer 216 is a 1×1 convolutional layer. A first rectified linear unit activation layer 206 is provided in front of one or a plurality of SCNN layers 204 and 208 included in the first stack 220. Furthermore, a first batch normalization layer can be configured to be provided behind one or a plurality of SCNN layers 204 and 208 included in the first stack 220.

The separable convolution subnetwork 150 includes one or a plurality of middle modules 108. The middle module 108 processes an output of the entry module 106 to generate an output of the middle module 108.

The middle module 108 includes a second pass-through convolutional layer 322, a second stack 320, and a second concatenation layer 316. The second pass-through convolutional layer 322 processes an input to the middle module 108 to generate a second pass-through output 324. The second stack 320 is the second stack of the SCNN layers, and processes an input to the middle module 108 to generate a second stack output 326. The second concatenation layer 316 concatenates the second pass-through output 324 and the second stack output 326 to generate an output of the middle module 108. For example, the separable convolution subnetwork 150 includes eight middle modules 108.

The second pass-through convolutional layer 322 is a 1×1 convolutional layer. A second rectified linear unit activation layer 304, 308, or 312 is provided in front of one or a plurality of SCNN layers 306, 310, and 314 included in the second stack 320. Furthermore, a second batch normalization layer can be configured to be provided behind one or a plurality of SCNN layers 306, 310, and 314 included in the second stack 320.

The separable convolution subnetwork 150 includes an exit module 110. The exit module 110 processes an output of the middle module 108 to generate an output of the exit module 110.

The exit module 110 includes a third pass-through convolutional layer 432, a third stack 420, a second maximum pooling layer 412, a third concatenation layer 414, a fourth stack 430, and an averaging pooling layer 426. The third pass-through convolutional layer 432 processes an output of the middle module 108 to generate a third pass-through output 434. The third stack 420 is the third stack of the SCNN layers, and processes an output of the middle module 108 to generate a third stack output 436. The second maximum pooling layer 412 performs maximum pooling on the third stack output 436 to generate a second maximum pooled output 438. The third concatenation layer 414 concatenates the third pass-through output 434 and the second maximum pooled output 438 to generate a concatenated output 440.

The third pass-through convolutional layer 432 is a 1×1 convolutional layer. A third rectified linear unit activation layer 404 or 408 is provided in front of one or a plurality of SCNN layers 406 and 410 included in the third stack 420. Furthermore, a third batch normalization layer can be configured to be provided behind one or a plurality of SCNN layers 406 and 410 included in the third stack 420.

The fourth stack 430 is the fourth stack of the SCNN layers, and processes the concatenated output 440 to generate a fourth stack output 442.

The averaging pooling layer 426 performs average pooling on the fourth stack output 442 to generate an output of the exit module 110.

A fourth rectified linear unit activation layer 416 or 422 is provided in front of one or a plurality of separable convolutional layers 418 and 424 included in the fourth stack 430. Furthermore, a fourth batch normalization layer can be configured to be provided behind one or a plurality of separable convolutional layers 418 and 424 included in the fourth stack 430.

As described above, according to the first exemplary embodiment, the neural network system 100 is able to reduce the amount of calculation for convolution, thus reducing the memory usage and the processing time.

In the first exemplary embodiment, an example in which a grouped convolution is used to reduce the amount of calculation without decreasing a learning effect, compared with the case of spatially convolving the entirety, has been described. With this method used, while a load in performing spatial convolution decreases, as the number of channels becomes larger, the amount of calculation for pointwise convolution become larger. A second exemplary embodiment is directed to reducing the amount of calculation for pointwise convolution without decreasing a learning effect. In the following description, features in which the second exemplary embodiment differs from the first exemplary embodiment are described.

In the second exemplary embodiment, each separable convolutional layer illustrated in FIG. 2 to FIG. 4 first divides an input into groups in a channel-wise manner, convolves the groups, and couples the convolved groups to generate an output, i.e., performs a grouped convolution to generate an intermediate output. Then, each separable convolutional layer illustrated in FIG. 2 to FIG. 4 performs a 1×1 convolution on the intermediate output, i.e., performs a grouped pointwise convolution which divides the intermediate output into groups in a channel-wise manner, convolves the groups, and couples the convolved groups, to generate a layer output.

At this time, the separable convolutional layer is broken down into calculations for the "combinations of $C_{in}$ input channels and kernels Kg×G groups" and is, therefore, able to reduce the amount of calculation to 1/G times. In this case, based on the number $C_{out}$ of output channels, the number g of groups for grouped convolution, and the number $C_{in}/g$ of groups for grouped pointwise convolution, a quadratic equation f(g) for g and a discriminant D are expressed by the following equations:

$$f(g)=C_{out}g^2-(k^2+C_{in}+C_{out})g+k^2C_{in}^2 \quad \text{(Equation 1), and}$$

$$D=C_{in}^2(k^2-C_{out})^2 \quad \text{(Equation 2)}.$$

Under the condition of f(g)<0, "D≥0" holds, so that a solution "g" exists. Therefore, in a case where a grouped convolution is used, under the above condition, it is possible to more reduce the amount of calculation than in a case where a depthwise convolution is used. Here, the depthwise convolution can be considered to be used when the number $C_{in}$ of input channels and the number G of groups are equal to each other.

Moreover, in the second exemplary embodiment, even if the number of channels to which each group refers is reduced by division into groups, kernels of respective different groups are learned while the dependence relationship between the input channel and the output channel is maintained. This leads to an expectation of not only a reduction in calculation cost caused by parallelization but also an increase in expressive power caused by widened expression, so that a learning effect is not reduced.

Moreover, as another example, the separable convolutional layer performs a 1×1 convolution on a received input, i.e., performs a grouped pointwise convolution which divides an input into groups in a channel-wise manner, convolves the groups, and couples the convolved groups to generate an output, to generate an intermediate output. Then, the separable convolutional layer performs a regular convolution on the intermediate output to generate a layer output.

Figure 7:
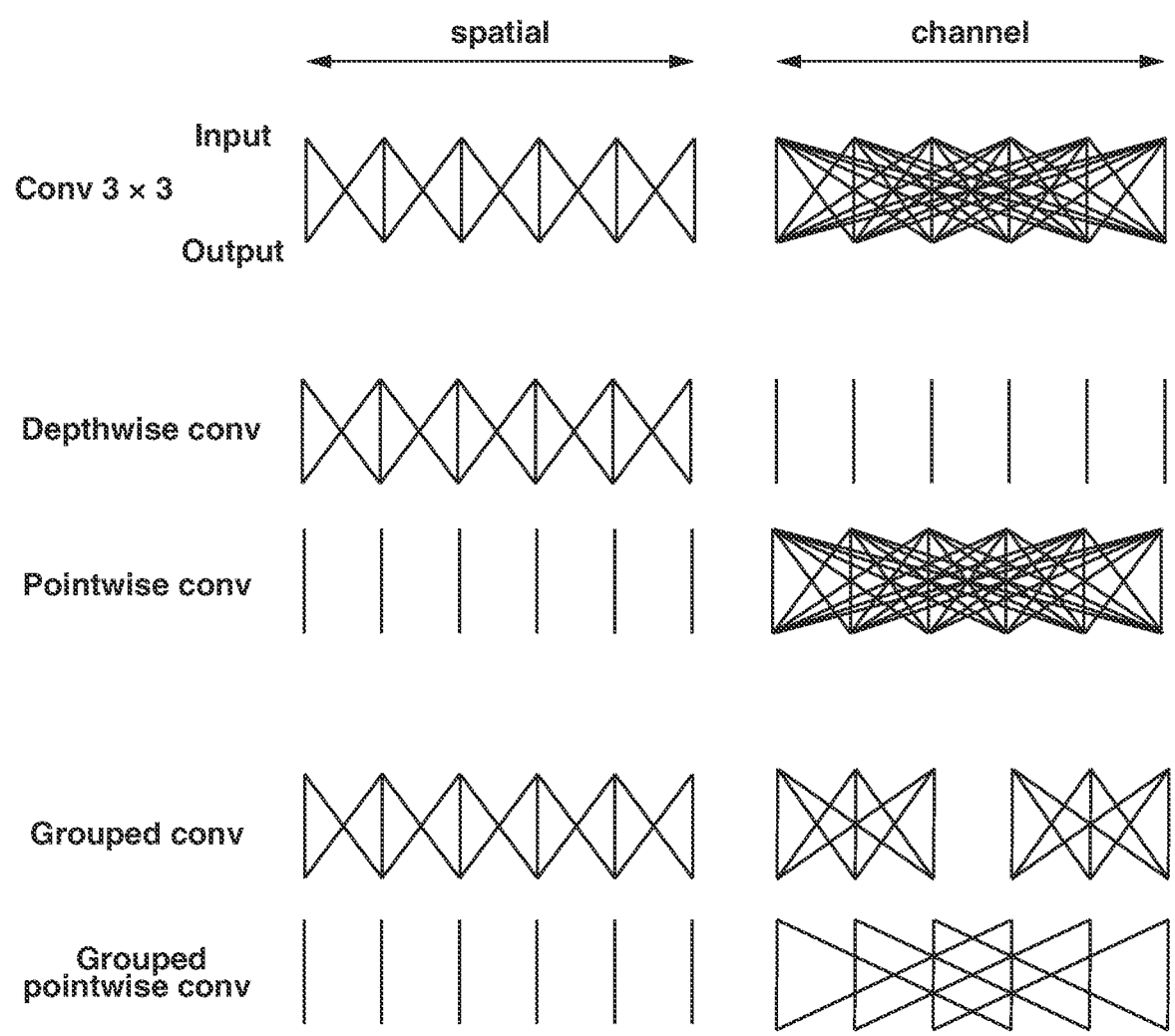
FIG. 7 is a diagram schematically illustrating convolutional neural network layers.

FIG. 7 is a diagram schematically illustrating convolutional neural network layers. In the case of a regular convolution (Cony 3×3), when a 3×3 convolution from an input (Input) to an output (Output) is performed, layers are able to be deployed in a spatial-wise manner (spatial) and a channel-wise manner (channel), and a direction in which respective points are convolved is indicated by a solid line.

A depthwise convolution (Depthwise cony) and a pointwise convolution (Pointwise cony) can be expressed as illustrated in FIG. 7. Moreover, a grouped convolution (Grouped Cony) and a grouped pointwise convolution (Grouped pointwise cony) can be expressed as illustrated in FIG. 7.

In the second exemplary embodiment, the separable convolutional layer performs a grouped convolution and then performs a grouped pointwise convolution on an intermediate output to generate a layer output. In that case, even if division is performed with respect to intermediate output channels by grouping, the separable convolutional layer performs convolution across between channels in which the output channel is not convolved at the intermediate output channel, thus forming a final output. In other words, the separable convolutional layer is able to generate a convolutional layer output referring to all of the channels.

As mentioned above, the neural network system 100 includes a separable convolution subnetwork 150. The separable convolution subnetwork 150 includes a plurality of SCNN layers arranged in a stack manner in sequence, such as the first stack 220, the second stack 320, the third stack 420, or the fourth stack 430.

Each of the plurality of SCNN layers separately applies a first grouped convolution and a second grouped convolution to an input to the SCNN layer to generate a layer output. The first grouped convolution is a spatial convolution which divides channels of the input to the first grouped convolution into groups in a channel-wise manner, convolves the grouped channels, and couples the convolved channels to generate an output. The second grouped convolution is a spatial convolution which divides channels calculated by the first grouped convolution into groups in a channel-wise manner, convolves the grouped channels, and couples the convolved channels to generate an output.

As described above, according to the second exemplary embodiment, the neural network system 100 is able to reduce the amount of calculation for pointwise convolution without decreasing a learning effect.

In the second exemplary embodiment, an example of reducing the amount of calculation for pointwise convolution without decreasing a learning effect has been described. A third exemplary embodiment is directed to, in the case of using a method of increasing the number of channels in a middle layer to improve expressive power, reducing the amount of calculation without decreasing a learning effect. In the following description, features in which the third exemplary embodiment differs from the first exemplary embodiment are described.

In the third exemplary embodiment, each separable convolutional layer illustrated in FIG. 2 to FIG. 4 first performs a 1×1 convolution on a received input, i.e., performs a grouped pointwise convolution which divides an input into groups in a channel-wise manner, convolves the groups, and couples the convolved groups to generate an output, to generate an intermediate output.

Then, each separable convolutional layer illustrated in FIG. 2 to FIG. 4 divides the intermediate output into groups in a channel-wise manner, convolves the groups, and couples the convolved groups to generate an output, i.e., performs a grouped convolution to generate a second intermediate output. Then, each separable convolutional layer illustrated in FIG. 2 to FIG. 4 performs a 1×1 convolution on the second intermediate output, i.e., performs a grouped pointwise convolution which divides the second intermediate output into groups in a channel-wise manner, convolves the groups, and couples the convolved groups, to generate a layer output.

Here, the expansion factor for the number of intermediate channels is denoted by "t", the number of output channels is denoted by $C_{out}$, the number of groups for grouped convolution is denoted by "g", and the number of groups for the first and second grouped pointwise convolutions is denoted by $C_{in}/g$. Then, under the condition of $1<g<C_{in}$, by using a grouped convolution, the separable convolutional layer is able to more reduce the amount of calculation than by using a depthwise convolution.

Furthermore, with regard to these grouped pointwise convolutions, any one of them can generate an output from a regular convolutional layer.

As mentioned above, the neural network system 100 includes a separable convolution subnetwork 150. The separable convolution subnetwork 150 includes a plurality of SCNN layers arranged in a stack manner in sequence, such as the first stack 220, the second stack 320, the third stack 420, or the fourth stack 430.

Each of the plurality of SCNN layers separately applies a first grouped convolution, a second grouped convolution, and a third grouped convolution to an input to the SCNN layer to generate a layer output. The first grouped convolution is a spatial convolution which divides channels of the input to the first grouped convolution into groups in a channel-wise manner, convolves the grouped channels, and couples the convolved channels to generate an output. The second grouped convolution is a spatial convolution which divides channels calculated by the first grouped convolution into groups in a channel-wise manner, convolves the grouped channels, and couples the convolved channels to generate an output. The third grouped convolution is a spatial convolution which divides channels calculated by the second grouped convolution into groups in a channel-wise manner, convolves the grouped channels, and couples the convolved channels to generate an output.

As described above, according to the third exemplary embodiment, in the case of using a method of increasing the number of channels in a middle layer to improve expressive power, the neural network system 100 is able to reduce the amount of calculation without decreasing a learning effect.

The present specification uses the term "configured" in connection with systems and computer program components. In the case of a system of one or a plurality of computers to be configured to perform particular operations or actions, it means that the system has installed thereon software, firmware, hardware, or a combination of them. These, in operation, cause the system to perform the operations or actions. In the case of one or a plurality of computer programs to be configured to perform particular operations or actions, it means that the one or a plurality of computer programs include instructions which, when executed by a data processing apparatus, cause the apparatus to perform the operations or actions.

Exemplary embodiments can be implemented in digital electronic circuitry, in tangibly-embodied computer software or firmware, in computer hardware, including the above-mentioned structures and their structural equivalents, or in combinations of one or a plurality of them.

Exemplary embodiments of the subject matter described in the present specification can be implemented as one or a plurality of computer programs, i.e., one or a plurality of modules of computer program instructions encoded on a tangible non-transitory storage medium for execution by, or to control the operation of, a data processing apparatus. The computer storage medium can be a machine-readable storage device, a machine-readable storage substrate, a random or serial access memory device, or a combination of one or a plurality of them. Alternatively or in addition, the program instructions can be encoded on an artificially-generated propagated signal, for example, a machine-generated electrical, optical, or electromagnetic signal, which is generated to encode information for transmission to a suitable receiver apparatus for execution by a data processing apparatus.

The term "data processing apparatus" refers to data processing hardware and includes, by way of example, a programmable processor, a computer, or a plurality of processors or computers. Moreover, the data processing apparatus encompasses all types of apparatuses, devices, and machines for processing data. Moreover, the data processing apparatus can also be, or can further include, dedicated logic circuitry, for example, a field programmable gate array (FPGA) or an application-specific integrated circuit (ASIC). The data processing apparatus can optionally include, in addition to hardware, code which creates an execution environment for computer programs.

The code constitutes, for example, processor firmware, a protocol stack, a database management system, an operating system, or a combination of one or a plurality of them.

A computer program may also be referred to as a program, software, a software application, an app, a module, a software module, a script, or code. The computer program can be written in any form of programming language, including compiled or interpreted languages, or declarative or procedural languages. The computer program can be deployed in any form, included as a stand-alone program or as a module, component, subroutine, or other unit suitable for use in a computing environment. The program can, but need not, correspond to a file in a file system. The program can be stored in a portion of a file which holds other programs or data, for example, one or a plurality of scripts stored in a markup language document, in a single file dedicated to the program in question. Alternatively, the program can be stored in a plurality of coordinated files, for example, files which store one or a plurality of modules, sub-programs, or portions of code. The computer program can be deployed to be executed on one computer or on a plurality of computers which is located at one site or is distributed across a plurality of sites and which is interconnected by a data communication network.

The methods and logic flows described in the present specification can be performed by one or a plurality of programmable computers which executes one or a plurality of computer programs to perform functions by operating on input data and generating an output. The methods and logic flows can also be performed by dedicated logic circuitry, for example, an FPGA or an ASIC, or by a combination of dedicated logic circuitry and one or a plurality of programmed computers.

Computers suitable for the execution of a computer program can be based on general-purpose or dedicated microprocessors or both, or any other type of central processing unit. A central processing unit is configured to receive instructions and data from a read-only memory or a random access memory or both. The essential elements of a computer are a central processing unit for performing or executing instructions and one or a plurality of memory devices for storing instructions and data. The central processing unit and the memory can be supplemented by, or incorporated in, dedicated logic circuitry. The computer also includes, or is operatively coupled to, one or a plurality of mass storage devices for storing data, for example, a magnetic disc or magneto-optical disc, or an optical disc. Then, the computer receives data from or transfers data to, or both, them. However, a computer does not need to necessarily have such devices. Moreover, the computer can be embedded in another device, for example, a mobile telephone, a personal digital assistant (PDA), a mobile audio or video player. Moreover, the computer can be embedded in a game console, a Global Positioning System (GPS) receiver, or a portable storage device, for example, a Universal Serial Bus (USB) flash drive, to name just a few examples.

Computer-readable media suitable for storing computer program instructions and data include, for example, semiconductor memory devices, such as erasable programmable read-only memory (EPROM), electrically erasable programmable read-only memory (EEPROM), and flash memory devices. Moreover, the computer-readable media include all forms of non-volatile memory, media, and memory devices, including magnetic discs, such as internal hard disks or removable disks, magneto-optical discs, and compact disc read-only memory (CD-ROM) and digital versatile disc read-only memory (DVD-ROM) discs.

To implement interaction with a user, a computer includes a display device, such as a cathode ray tube (CRT) or a liquid crystal display (LCD) monitor, for displaying information to the user. Moreover, the computer includes a keyboard and a pointing device, such as a mouse or a trackball, by which the user can provide an input to the computer. Other types of devices can be used to implement interaction with a user as well. For example, feedback provided to the user can be any form of sensory feedback, for example, visual feedback, auditory feedback, or tactile feedback. An input from the user can be received in any form, including acoustic, speech, or tactile input. The computer can interact with a user by sending documents to and receiving documents from a device which is used by the user, for example, by sending web pages to a web browser on a user's device in response to requests received from the web browser. The computer can interact with a user by sending text messages or other forms of message to a personal device, for example, a smartphone which is running a messaging application, and receiving responsive messages from the user in return.

A data processing apparatus for implementing machine learning models can also include, for example, dedicated hardware accelerator units or circuits for processing common and compute-intensive parts of machine learning training or production, i.e., inference and workloads.

Machine learning models can be implemented and deployed using a machine learning framework, for example, a TensorFlow framework, a Microsoft Cognitive Toolkit framework, an Apache Singa framework, or an Apache MXNet framework.

Exemplary embodiments of the subject matter described in the present specification can be implemented in a computing system. The computing system includes a back-end component, for example, a data server, includes a middleware component, for example, an application server, or includes a front-end component, for example, a client computer. The client computer has a graphical user interface, a web browser, or an app. Through these, a user can interact with an implementation of the subject matter described in the present specification, or any combination of one or a plurality of such back-end component, middleware component, or front-end component.

The components of the system can be interconnected by any form or medium of digital data communication, for example, a communication network. Examples of communication networks include a local area network (LAN) and a wide area network (WAN), such as the Internet.

The computing system can include clients and servers. The client and server are generally remote from each other and typically interact through a communication network. The relationship between the client and server arises by virtue of computer programs running on the respective computers and having a client-server relationship to each other. For example, the server transmits data, for example, a HyperText Markup Language (HTML) page, to a user device, for example, for purposes of displaying data to and receiving a user input from a user interacting with the device, which acts as a client. Data generated at the user device, for example, a result of the user interaction, can be transmitted from the user device to and received at the server.

While the present specification contains many specific implementation details, these should not be construed as limitations on the scope of any disclosure or on the scope of what may be claimed, but rather as descriptions of features which may be specific to particular exemplary embodiments. Some features which are described in the present specification in the context of separate exemplary embodiments can also be implemented in combination in a single exemplary embodiment. Conversely, various features which are described in the context of a single exemplary embodiment can also be implemented in a plurality of exemplary embodiments separately or in any suitable subcombination. Moreover, although features may be described above as acting in given combinations and even initially be claimed as such, one or a plurality of features from a claimed combination can in some cases be excised from the combination. The claimed combination can be directed to a subcombination or a variation of the subcombination.

Operations are depicted in the drawings and recited in the claims in a particular order. This should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the exemplary embodiments described above should not be understood as requiring such separation in all of the exemplary embodiments. It should be understood that the described program components and systems can generally be integrated together in a single software product or packaged into a plurality of software products.

Specific exemplary embodiments of the subject matter have been described. Other exemplary embodiments are within the scope of the following claims. For example, the actions recited in the claims can be performed in a different order and can still achieve desirable results. As one example, the processes depicted in the accompanying drawings do not necessarily require the particular order shown, or sequential order, to achieve desirable results. For example, in some cases, multitasking and parallel processing may be advantageous.

Furthermore, the above-described exemplary embodiments are merely embodiments illustrating specific examples in implementing the present disclosure, and the technical scope of the present disclosure should not be interpreted in a limited way due to such specific examples. In other words, the present disclosure can be implemented in various forms without departing from the technical idea thereof or the principal feature thereof.

According to aspects of the present disclosure, it is possible to reduce the amount of calculation for convolution.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-124719 filed Aug. 4, 2022, which is hereby incorporated by reference herein in its entirety.

What is claimed is:

1. A neural network system comprising:
a separable convolution subnetwork,
wherein the separable convolution subnetwork includes a plurality of separable convolutional neural network (SCNN) layers arranged in a stack manner in sequence,
wherein each of the plurality of SCNN layers applies a first grouped convolution to an input to the SCNN layer,
wherein an input to the first grouped convolution includes a plurality of channels,
wherein the first grouped convolution is a spatial convolution which divides channels of the input to the first grouped convolution into groups in a channel-wise manner, convolves the grouped channels, and couples the convolved channels to generate an output,
wherein each of the plurality of SCNN layers separately applies the first grouped convolution and then a grouped pointwise convolution to an input to the SCNN layer to generate a layer output, and
wherein the grouped pointwise convolution is broken into combination of input channels and kernels groups to reduce an amount of calculation time.

2. The neural network system according to claim 1, wherein the grouped pointwise convolution is a 1×1 convolution which projects the channels calculated by the first grouped convolution onto a new channel space.

3. The neural network system according to claim 1, wherein each of the plurality of SCNN layers separately applies the first grouped convolution and a regular convolution to an input to the separable convolutional neural network layer to generate the layer output, and
wherein the regular convolution is a regular convolution to be applied to channels calculated by the first grouped convolution.

4. The neural network system according to claim 1, wherein each of the plurality of SCNN layers separately applies the first grouped convolution and a second grouped convolution to an input to the SCNN layer to generate a layer output, and
wherein the second grouped convolution is a spatial convolution which divides channels calculated by the first grouped convolution into groups in a channel-wise manner, convolves the grouped channels, and couples the convolved channels to generate an output.

5. The neural network system according to claim 1, wherein each of the plurality of SCNN layers separately applies the first grouped convolution, a second grouped convolution, and a third grouped convolution to an input to the SCNN layer to generate a layer output,
wherein the second grouped convolution is a spatial convolution which divides channels calculated by the first grouped convolution into groups in a channel-wise manner, convolves the grouped channels, and couples the convolved channels to generate an output, and
wherein the third grouped convolution is a spatial convolution which divides channels calculated by the second grouped convolution into groups in a channel-wise manner, convolves the grouped channels, and couples the convolved channels to generate an output.

6. The neural network system according to claim 1, further comprising an output subnetwork configured to process an output of the separable convolution subnetwork to generate a network output.

7. The neural network system according to claim 1, further comprising an input subnetwork configured to process a network input to generate an initial output.

8. The neural network system according to claim 7, wherein the input subnetwork includes one or a plurality of convolutional neural network layers.

9. The neural network system according to claim 7, wherein the separable convolution subnetwork includes one or a plurality of entry modules, and
wherein the entry module processes the initial output to generate an output of the entry module.

10. The neural network system according to claim 9, wherein the entry module includes:
a first pass-through convolutional layer configured to process an input to the entry module to generate a first pass-through output;
a first stack being the first stack of the SCNN layers and configured to process an input to the entry module to generate a first stack output;
a first maximum pooling layer configured to perform maximum pooling on the first stack output to generate a first maximum pooled output; and a first concatenation layer configured to concatenate the first pass-through output and the first maximum pooled output to generate an output of the entry module.

11. The neural network system according to claim 9, wherein the separable convolution subnetwork includes three entry modules.

12. The neural network system according to claim 10, wherein the first pass-through convolutional layer is a 1×1 convolutional layer.

13. The neural network system according to claim 10, wherein a first rectified linear unit activation layer is provided in front of one or a plurality of the SCNN layers included in the first stack.

14. The neural network system according to claim 10, wherein a first batch normalization layer is provided behind one or a plurality of the SCNN layers included in the first stack.

15. The neural network system according to claim 9, wherein the separable convolution subnetwork includes one or a plurality of middle modules, and
wherein the middle module processes an output of the entry module to generate an output of the middle module.

16. The neural network system according to claim 15, wherein the middle module includes:
a second pass-through convolutional layer configured to process an input to the middle module to generate a second pass-through output;
a second stack being the second stack of the SCNN layers and configured to process an input to the middle module to generate a second stack output; and
a second concatenation layer configured to concatenate the second pass-through output and the second stack output to generate an output of the middle module.

17. The neural network system according to claim 15, wherein the separable convolution subnetwork includes eight middle modules.

18. The neural network system according to claim 16, wherein the second pass-through convolutional layer is a 1×1 convolutional layer.

19. The neural network system according to claim 16, wherein a second rectified linear unit activation layer is provided in front of one or a plurality of the SCNN layers included in the second stack.

20. The neural network system according to claim 16, wherein a second batch normalization layer is provided behind one or a plurality of the SCNN layers included in the second stack.

21. The neural network system according to claim 15, wherein the separable convolution subnetwork includes an exit module, and
wherein the exit module processes an output of the middle module to generate an output of the exit module.

22. The neural network system according to claim 21, wherein the exit module includes:
a third pass-through convolutional layer configured to process an output of the middle module to generate a third pass-through output;
a third stack being the third stack of the SCNN layers and configured to process an output of the middle module to generate a third stack output;
a second maximum pooling layer configured to perform maximum pooling on the third stack output to generate a second maximum pooled output; and
a third concatenation layer configured to concatenate the third pass-through output and the second maximum pooled output to generate a concatenated output.

23. The neural network system according to claim 22, wherein the third pass-through convolutional layer is a 1×1 convolutional layer.

24. The neural network system according to claim 22, wherein a third rectified linear unit activation layer is provided in front of one or a plurality of the SCNN layers included in the third stack.

25. The neural network system according to claim 22, wherein a third batch normalization layer is provided behind one or a plurality of the SCNN layers included in the third stack.

26. The neural network system according to claim 22, wherein the exit module further includes:
a fourth stack being the fourth stack of the SCNN layers and configured to process the concatenated output to generate a fourth stack output; and
an average pooling layer configured to perform average pooling on the fourth stack output to generate an output of the exit module.

27. The neural network system according to claim 26, wherein a fourth rectified linear unit activation layer is provided in front of one or a plurality of the SCNN layers included in the fourth stack.

28. The neural network system according to claim 26, wherein a fourth batch normalization layer is provided behind one or a plurality of the SCNN layers included in the fourth stack.

29. The neural network system according to claim 1, wherein the neural network system is configured to receive an input image and to generate a network output for the input image.

30. A processing method for a neural network system, the processing method comprising:
causing the neural network system to include a separable convolution subnetwork;
causing the separable convolution subnetwork to include a plurality of separable convolutional neural network (SCNN) layers arranged in a stack manner in sequence;
causing each of the plurality of SCNN layers to apply a first grouped convolution to an input to the SCNN layer;
causing an input to the first grouped convolution to include a plurality of channels; and
causing the first grouped convolution to be a spatial convolution which divides channels of an input to the first grouped convolution into groups in a channel-wise manner, convolves the grouped channels, and couples the convolved channels to generate an output,
wherein each of the plurality of SCNN layers separately applies the first grouped convolution and then a grouped pointwise convolution to an input to the SCNN layer to generate a layer output, and
wherein the grouped pointwise convolution is broken into combination of input channels and kernels groups to reduce the amount of calculation time.

31. A non-transitory computer-readable storage medium storing computer-executable instructions that, when executed by a computer, cause the computer to perform a processing method for a neural network system, the processing method comprising:
causing the neural network system to include a separable convolution subnetwork;
causing the separable convolution subnetwork to include a plurality of separable convolutional neural network (SCNN) layers arranged in a stack manner in sequence;

causing each of the plurality of SCNN layers to apply a first grouped convolution to an input to the SCNN layer;

causing an input to the first grouped convolution to include a plurality of channels; and causing the first grouped convolution to be a spatial convolution which divides channels of an input to the first grouped convolution into groups in a channel-wise manner, convolves the grouped channels, and couples the convolved channels to generate an output, wherein each of the plurality of SCNN layers separately applies the first grouped convolution and then a grouped pointwise convolution to an input to the SCNN layer to generate a layer output, and wherein the grouped pointwise convolution is broken into combination of input channels and kernels groups to reduce the amount of calculation time.

* * * * *